Patented Dec. 2, 1952

2,620,342

UNITED STATES PATENT OFFICE 2,620,342

SULFITE COMPOUNDS OF PYRIDINE ALDEHYDES

Wilhelm Mathes and Walter Sauermilch, Ludwigshafen-on-the-Rhine, Germany, assignors to Dr. F. Raschig G. m. b. H., Ludwigshafen-on-the-Rhine, Germany No Drawing. Application March 5, 1952, Serial No. 275,034. In Germany March 12, 1951

6 Claims. (Cl. 260—297)

1

The present invention relates to the production of sulfite compounds of pyridine aldehydes.

Sodium bisulfite addition compounds of aldehydes which are produced from sodium bisulfite and aldehydes are generally known and are normally employed for the isolation and purification of aldehydes. Aromatic aldehydes such as benzaldehyde do not react with free sulfurous acid and the free oxysulfonic acid of benzaldehyde which should be obtained upon acidification of the sodium bisulfite addition product is unstable and therefore unknown.

It has now been discovered that contrary to usual aromatic aldehydes, pyridine aldehydes will react with free sulfurous acid to produce compounds which evidently are the free oxysulfonic acid compounds. These compounds are water insoluble and are well suited for the isolation and purification of pyridine aldehydes.

Pyridine aldehydes which are produced according to the process described in our prior application, Serial No. 251,624, filed on October 16, 1951, can be recovered from the reaction mixtures and purified in a simple manner by the process according to the invention. For example, the dilute aqueous reaction mixtures obtained in accordance with the process of such prior application which contain about 5% of pyridine aldehydes and an excess of unconverted pyridine bases can be treated directly with $SO_2$ whereby the solid addition products crystallize out with a good yield and are easily separated from the pyridine bases present as the sulfurous acid salts of such bases are easily soluble in water. If desired, the dilute aqueous reaction mixtures can first be extracted with organic solvents such as chloroform or benzol and the resulting extracts after the addition of a sufficient quantity of water can be saturated with $SO_2$ to precipitate out the free oxysulfonic acid addition product.

The novel sulfite compounds of pyridine aldehydes are exceptionally stable in comparison with the free pyridine aldehydes. It is believed that they are the oxysulfonic acid compounds which, for alpha pyridine aldehyde, would have the following formula.

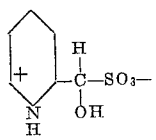

By treatment with alkalis, the free acid addition products can be converted into the sodium bisulfite addition products which are easily soluble in water and usable for the normal reactions.

2

The free oxysulfonic acid addition products may be recovered from the sodium bisulfite addition products by treatment with dilute non-oxidizing mineral acids or weak acids such as acetic or citric acid. The free pyridine aldehydes can be recovered from the free oxysulfonic addition compounds by treatment with more concentrated non-oxidizing mineral acids, for example, 30% $H_2SO_4$ or concentrated HCl, the $SO_2$ which is formed being removed by evaporation at normal pressures or preferably under vacuum. As the oxysulfonic acid products are stable in dilute acids, they can be formed by treatment of weakly acidic solutions of pyridine aldehydes. The presence of inert organic solvents such as chloroform, benzol or alcohol does not hinder the formation of the oxysulfonic acid products as long as a molar quantity of water with reference to the pyridine aldehyde content is present.

The following examples will serve to illustrate the manner in which the process according to the invention can be carried out.

Example 1

50 liters of air together with the vapors obtained from 350 cc. of a 5% aqueous alpha picoline solution were passed per hour at 410° C. over 100 ccm. of a catalyst composed of 10% of a 30/70 Mo $O_3$/$V_2O_5$ mixture and 90% of an iron-free silica gel arranged in an aluminum catalyst chamber. The vapors leaving the catalyst chamber were condensed and a deep blue liquid smelling strongly of pyridine aldehyde was obtained.

500 cc. of blue condensate were extracted twice with 100 ccm. of chloroform and the chloroform layer was separated off in a separatory funnel. The extracts were combined and after the addition of 2 ccm. of water, they were saturated while stirring with $SO_2$. A substantially colorless precipitate of alpha-pyridyl-oxy-methane sulfonic acid was formed. The precipitate was filtered off, washed and dried. The yield was 15 grams. The melting point of such product measured in a sealed melting point tube was about 210° C.

When the alpha picoline solution employed as the starting material in the production of the pyridine aldehyde was replaced by gamma picoline and by 2,6 dimethyl pyridine, gamma pyridine aldehyde and 6 methyl alpha pyridine aldehyde were obtained. The melting points of the corresponding oxysulfonic acids respectively were about 243° C. and 185° C.

The free oxysulfonic acid products are easily converted to the corresponding water soluble sodium salts by treatment with alkali. For example, sodium alpha pyridyl-oxy-methane sulfonate can be produced by dissolving 18.9 grams of the solid free acid in 20 ccm. of a $5n$ sodium hydroxide solution. The free acid can be precipitated again from such salt solution by acidification with dilute acids such as hydrochloric, sulfuric, acetic, citric or tartaric acid and 90% of the original oxysulfonic acid can be recovered thereby.

The oxysulfonic acids can also be converted to the free pyridine aldehydes by treatment with strong mineral acids. For example, 100 ccm. of concentrated hydrochloric acid were heated to boiling and 100 grams of alpha-pyridyl-oxy-methane sulfonic acid were introduced over a period of 20 minutes. Heating was continued for ten minutes after the addition was completely dissolved in the boiling acid. The solution was then cooled and introduced into a liter bottle. 250 cc. of benzol were introduced into the bottle and the mixture was neutralized with soda while shaking or stirring. An excess of soda was avoided. The benzol layer was then separated off and the watery layer further shaken once with 100 cc. of benzol and twice with 50 cc. of benzol. The benzol extracts were combined and subjected to fractional distillation at normal pressures until the remaining liquid amounted to about 100 cc. and this remaining liquid was fractionated under vacuum until all of the benzol had been removed. Thereafter the pyridine aldehyde was distilled and 49.4 grams were obtained which corresponded to 87% of the theoretical.

*Example 2*

The alpha pyridine aldehyde containing condensate which was produced according to the procedure described in Example 1 and still contained a small quantity of unconverted alpha picoline was directly saturated with $SO_2$ gas. The original blue color of the solution turned brown and a nearly colorless finely crystalline precipitate of alpha-pyridyl-oxy-methane sulfonic acid separated out and was filtered off. The mother liquor which was saturated with $SO_2$ was heated to remove the excess $SO_2$ which was recycled to the fresh condensate. A yield of 30 to 35 grams of alpha-pyridyl-oxy-methane sulfonic acid were obtained per 1000 cc. of condensate. This procedure was found to be well suited for the continuous production of the oxysulfonic acid products and for the continuous separation thereof from the excess pyridine bases contained in the reaction solution.

We claim:

1. A process for the production of sulfite compounds of pyridine aldehydes which comprises reacting a pyridine aldehyde with sulfur dioxide and water.

2. A process for the production of sulfite compounds of pyridine aldehydes which comprises introducing $SO_2$ into an aqueous solution of a pyridine aldehyde.

3. A process for the production of sulfite compounds of pyridine aldehydes which comprises introducing $SO_2$ into a weakly acidic aqueous solution of a pyridine aldehyde.

4. A process for the production of sulfite compounds of pyridine aldehydes which comprises introducing $SO_2$ into a solution of a pyridine aldehyde in an organic solvent in the presence of at least one mol of water per mol of pyridine aldehyde.

5. A process for the purification of a pyridine aldehyde in admixture with a pyridine base which comprises reacting the pyridine aldehyde with $SO_2$ and water, separating the resulting solid sulfite compound from the reaction mixture and decomposing such sulfite compound with a strong non-oxidizing mineral acid.

6. A pyridyl-oxy-methane sulfonic acid.

WILHELM MATHES.
WALTER SAUERMILCH.

No references cited.